United States Patent [19]
Prest

[11] Patent Number: 5,980,354
[45] Date of Patent: Nov. 9, 1999

[54] STORYBOARD TOYS FOR NURTURING COGNITION AND LEARNING STRATEGIES

[76] Inventor: Jed Prest, Site 13, Comp. 7B, R.R. #2, Wolfville, Canada, IXO

[21] Appl. No.: 09/072,641

[22] Filed: May 4, 1998

[51] Int. Cl.$^6$ .......................... A63H 33/00; A63H 33/38; G09B 1/36

[52] U.S. Cl. .......................... 446/227; 446/147; 434/171

[58] Field of Search .................................... 446/147, 227, 446/149, 151, 482, 487, 489, 901; 434/169, 167, 171, 172, 176, 317

[56] References Cited

U.S. PATENT DOCUMENTS

| | | | |
|---|---|---|---|
| 1,479,423 | 1/1924 | Barton | 434/172 |
| 1,735,456 | 11/1929 | Garman . | |
| 2,839,843 | 6/1958 | Keyko | 434/167 X |
| 2,946,137 | 7/1960 | Worth et al. | 446/147 X |
| 3,210,865 | 10/1965 | Muntz | 434/172 |
| 3,274,706 | 9/1966 | Friend | 446/901 X |
| 3,302,310 | 2/1967 | Leven . | |
| 3,357,116 | 12/1967 | Bazacos . | |
| 3,777,416 | 12/1973 | Milligan et al. . | |
| 4,176,473 | 12/1979 | Rae | 446/147 X |
| 4,205,850 | 6/1980 | Craig . | |
| 4,306,868 | 12/1981 | Hankins | 434/167 X |
| 4,722,713 | 2/1988 | Williams et al. | 446/227 |
| 4,731,027 | 3/1988 | Phinney | 434/169 X |
| 5,167,509 | 12/1992 | Guffrey . | |
| 5,188,533 | 2/1993 | Wood | 434/169 |
| 5,441,262 | 8/1995 | Figone et al. . | |
| 5,478,268 | 12/1995 | Au | 446/227 |
| 5,575,658 | 11/1996 | Barnard . | |
| 5,628,513 | 5/1997 | Soriano . | |

FOREIGN PATENT DOCUMENTS

| | | |
|---|---|---|
| 243556 | 1/1921 | Canada . |
| 422070 | 6/1936 | Canada . |
| 844824 | 6/1970 | Canada . |
| 151763 | 10/1920 | United Kingdom . |
| 214098 | 4/1924 | United Kingdom . |

OTHER PUBLICATIONS (Author) Stanley I Greenspan (Title) "The Growth of the Mind" (Date) 1997 (pp.): 74–109; 133–160.

(Author) John M$^c$Shane (Title): "Cognitive Development: An Information Processing Approach" (Date): 1991 (pp.): 161–198.

(Authors) Rene Van DerVeer & Jaan Valsiner (Title): "The Vygotsky Reader" (Date): 1994 (pp.): 142–146.

*Primary Examiner*—D. Neal Muir
*Attorney, Agent, or Firm*—Palmer C. DeMeo; Mario D. Theriault

[57] ABSTRACT

In one embodiment, there is provided a cognition nurturing toy comprising at least one rigid board having a series of cavities therein, with each cavity having a distinct outline belonging to a first set. There is also provided a series of colorful illustrations printed on the board with each illustration encompassing one cavity. Each illustration in the series is arranged on the rigid board in a coherent order portraying at least one environment. The cognition nurturing toy also comprises a plurality of distinct pieces each having a shape corresponding to one of the outlines of the cavities such that each piece is insertable in only one of the cavities. Each piece further has colors and graphic properties of the illustration encompassing the corresponding cavity. A child using the cognition nurturing toy is able to associate each piece to only one of the cavities, using shape recognition, color recognition and whole picture recognition. The child is further able to assign a sequence to the outlines in the set and to the distinct pieces using the coherent order of the illustrations within the environment. There is also provided a method for nurturing learning strategies, primarily by providing a child with a multiplicity of auxiliary signs such that the child can develop an awareness to alternate recourse for associating new experiences to existing knowledge.

21 Claims, 10 Drawing Sheets

And the first thing you see when the Elephant enters is the large Feather on the head of a Girl front and center.

And if you are hungry, you can hear the vendor sing we have Hot dogs and Ice cream and Jelly beans fit for a King.

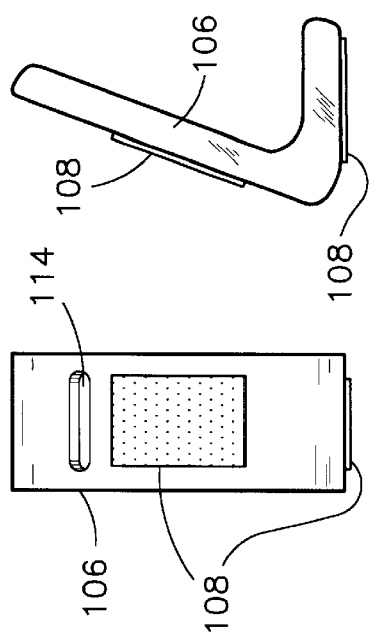
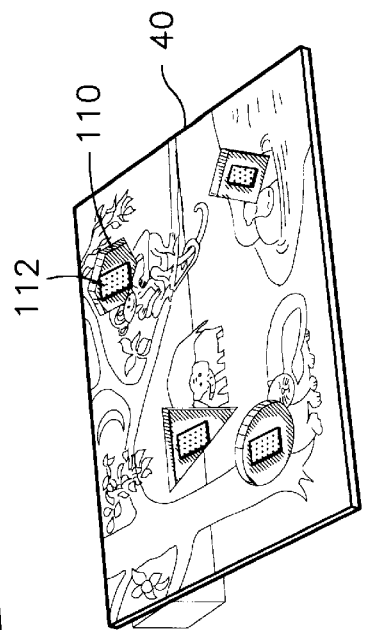
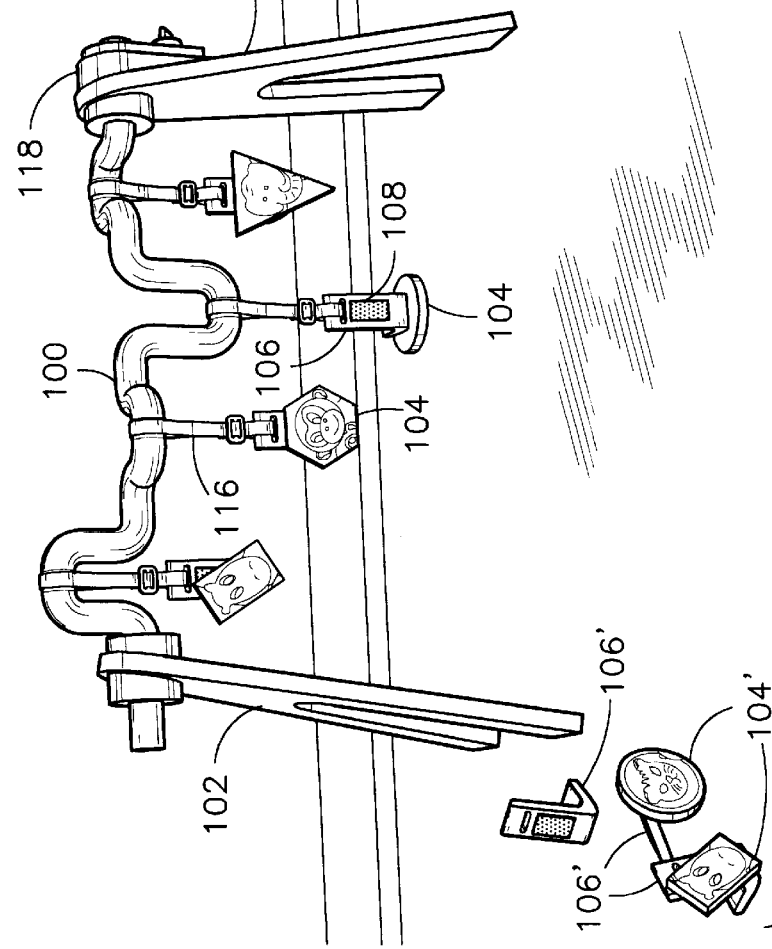

STORYBOARD TOYS FOR NURTURING COGNITION AND LEARNING STRATEGIES

FIELD OF THE INVENTION

This invention pertains to educational toys and methods for nurturing cognitive development of preschool children. More particularly, the educational toys of the present invention are characterized by the variety of their auxiliary signs by which a child can develop learning strategies.

BACKGROUND OF THE INVENTION

Each and every one of us, regardless of our culture, colour, creed, or intellectual challenge, begins a quest from birth to lead a productive and fruitful life. Although, this inner drive is felt at various levels by adults, it is much more intense when one considers the life of his or her own child. Therefore, newborn babies are generally symbols of hope and great expectations to their parents.

Parents and educators should appreciate, however, that one of the greatest encouragements that one can give a child for preparing him/her to accomplish his/her quest in life is to foster the development of learning strategies at a very young age. The experiences of the first years of life are believed to be crucial to an individual's future well being. It is believed that the first three years of a child's life, when his/her growth is most rapid, is one of the most important periods there will ever be for increasing his/her mental abilities.

Scholars in the field of cognitive development of children also believe that children have the ability to learn early in life. They also believe that this ability should be developed in order to better prepare the child for his/her school years and adult life.

In a first reference; "The Growth of the Mind", by Stanley I. Greenspan M.D., pp.74–109 and 133–160, (1997) the author teaches the importance of helping a child creating and organizing his/her internal world that permits what we call thinking. Furthermore, the author teaches that there is mounting evidence that environmental influences can alter the physical structure of the brain, determining in part how genes express themselves in both biology and behaviour. The author also points out that educational experts maintained that improving children's early environment would raise their intellectual abilities and better prepare them to survive, even thrive in the complex world they would inherit.

In a second reference: "Cognitive Development: An Information Processing Approach", by John McShane, pp. 161–198, (1991), the author teaches that infants are capable of learning from birth, which implies the presence of a basic memory system and that the basic structure of the memory system is part of an innate architecture of cognition.

In another book entitled "The Vygotsky Reader" by René van der Veer & Jaan Valsiner, pp. 142–146, (1994), the authors further teach that a child memory, even at the most primitive stages of psychological development comprises principally two different types of memory functions. The first type of memory function called the natural memory, is characterized by the immediate impression of material by the simple after-effect of actual experiences. This kind of memory is very near to perception and is dominating in primitive behaviour.

The second type of memory function is often called the instrumental memory, associative memory, or the use of learning strategies. It goes far beyond the limits of natural memory, adding to the psychological structure of the natural memory certain external signs that are used as active agents governing the psychological process from without. When the infant cannot solve the problem by way of direct mobilization of his/her natural memory, he/she has recourse to certain external manipulations, organizing himself/herself through the organization of objects, creating artificial stimuli that have a reverse action of allowing him/her to solve the problem of remembering. This is a psychological behaviour which helps a child to overcome the limits set for memory by natural laws, and what is most important according to the authors, it is primarily this mechanism in memory which is subject to development.

The inventor of the instant inventions believes that through free play with educational toy systems that are abounding in external stimuli, children are provided with experiences necessary to teach them essential learning strategies associated with development of the advanced memory functions. It is believed that educational toys abounding in auxiliary signs by which a child can associate new information, can lay a foundation of strategic behaviours which the young infant can experience and prosper from for future learning. No longer will strategic behaviour randomly emerge from a child's early childhood experience. By virtue of educational toys rich in learning stimuli, the very associative memory function that children possess at birth may be transformed into an emergent pattern of strategic abilities which may support their intelligence for the rest of their lives.

It has been found that the educational toys of the prior art, in general, lack the auxiliary signs or the variety of stimuli, to effectively develop learning strategies of children. For example, the Great Britain Patent 214,098 issued on Apr. 17, 1924 to C. H. Planck illustrates an alphabet puzzle. The puzzle shows the letters of the alphabet with illustrations corresponding to the letters. Each puzzle piece interlocks with only one other letter piece by way of a unique profile common only to adjacent pieces, such that a child can learn the sequence of the letters of the alphabet.

In a second example, the U.S. Pat. No. 3,302,310 issued on Feb. 7, 1967 to G. R. Leven, discloses an educational puzzle for teaching the phonetic of letters. The puzzle has pieces illustrating letters and pieces illustrating objects. Each letter piece is lockable, by way of a uniquely shaped tab, only with a related series of object pieces. A piece "A" for example is lockable with an object piece having the letter "A" such as an "apple", a "fan", or a "bat".

In yet another example, U.S. Pat. No. 5,575,658 issued on Nov. 19, 1996 to C. Barnard, discloses another form of puzzle for teaching the letters of the alphabet. The puzzle has three sets of puzzle pieces. A first set of pieces represents the lowercase letters. A second set of pieces represents the uppercase letters. A third set of pieces represents groups of letters. The lowercase letters fit into corresponding cavities in the uppercase letters. The uppercase letters fit into cavities in the group pieces. Hence, the puzzle provides a means for teaching simultaneously the uppercase letters, the lowercase letters and the sequence of the letters of the alphabet. In this invention, the lowercase letters may have a different colour than the uppercase letters, and of course, all the pieces in one group on a larger puzzle piece may be identically coloured.

For a child who does not yet know the letters of the alphabet, the learning of these letters using the educational puzzles of the prior art may represent an insurmountable task. The signs by which a child may associate and remember the new information are limited to the shape of the letters, the shape of the interlocking tabs joining pairs of pieces together, and the colours common to two or more letters in a same group. It will be appreciated that children are not all gifted equally for colour and shape recognition. According to some studies, particularly the aforesaid book entitled "Cognitive Development: An Information Processing Approach", by John McShane, pp. 164–167, (1991), children are known to be more talented for image or picture recognition than for memorizing shapes and colours.

This observation will be further appreciated by the persons fervent of puzzles. It is known to these persons that the difficulty level in finding the right placement of a puzzle piece increases substantially when the piece belongs to a section of a puzzle representing an homogeneous blue sky, a dense forest or a calm sea. In these cases the player can only rely on shape and colour recognition for finding the correct placement of the piece. The inventor of the present inventions believes that the same difficulty level is experienced by a young infant trying to learn the letters of the alphabet or numerical symbols when the only external stimuli available to that child are those of shape and colour.

SUMMARY OF THE INVENTION

In the cognition nurturing toys of the present invention, however, there are provided a multiplicity of external signs by which a child can associate and memorized new knowledge. It is believed that this multiplicity of external signs enhances the awareness of a child for alternate recourse for associating new experiences to existing knowledge. The auxiliary signs give that child the ability to practice the uses of these alternate recourse, thereby fostering the development of a strategic approach to learning.

In a first aspect of the present invention, there is provided a cognition nurturing toy comprising at least one rigid board having a series of cavities therein, with each cavity having a distinct outline belonging to a first set. There is also provided a series of colourful illustrations printed on the board with each illustration encompassing one cavity. Each illustration in the series is arranged on the rigid board in a coherent order portraying at least one environment. The cognition nurturing toy also comprises a plurality of distinct pieces each having a shape corresponding to one of the outlines of the cavities such that each piece is insertable in only one of the cavities. Each piece further has colours and graphic properties of the illustration encompassing the corresponding cavity.

A primary advantage of the cognition nurturing toy of the present invention is that a child using the rigid board and the distinct pieces is able to associate each piece to only one of the cavities, using shape recognition, colour recognition and whole picture recognition. The child is further able to assign a sequence to the outlines in the set and to the distinct pieces using the coherent order of the illustrations within the environment.

In another aspect of the present invention, the cognition nurturing toy comprises a book of rigid boards each containing one or more distinct outlines belonging to the first set, and each of the one or more distinct outlines is encompassed by an illustration portraying at least one environment. Furthermore, each board in the book depicts a written strophe related to the environment illustrated on that board, and each strophe is part of a poetic story depicted throughout the book. When the strophes and the poem are read to a child, that child can use auditory signs in the strophes and in the poem for remembering the sequence of the distinct pieces within each environment, and the sequence of the distinct pieces within two different environments depicted on subsequent page boards.

In a further aspect of the present invention, there is provided a structure having an horizontal crank-bar and a plurality of retainers hung to that bar for holding the distinct puzzle pieces of a puzzle board above a reference surface. The horizontal crank-bar is movable in a circular motion about a longitudinal axis thereof, for moving the distinct puzzle pieces up and down and back and forth relative to the reference surface. Thus, when the puzzle board is laid on the reference surface at a distance from the structure, and when the puzzle pieces are held by the retainers, a child using the puzzle board, the distinct puzzle pieces and the structure is able to simultaneously develop a motivation to reach and a perception of depth.

In yet another aspect of the present invention, there is provided a new method for nurturing learning strategies of a child. The new method of the present invention comprises the steps of providing the child with a series of new symbols to be remembered, and simultaneously providing the child with a multiplicity of auxiliary signs related to the new symbols. The multiplicity of auxiliary signs typically comprises at least four auxiliary signs selected from a group of signs comprising visual shapes, auditory signs, tactile signs, colours, images, symmetry between a pair of images, alternate views of illustrations depicted in the images, and environments depicted in the images. This method is advantageous for providing the child with the ability to develop an awareness to alternate recourse for associating the new symbols to current knowledge, and for providing the child with the means for practising the uses of these alternate recourse.

BRIEF DESCRIPTION OF THE DRAWINGS

The preferred embodiments of the present invention will be further understood from the following description, with reference to the drawings in which:

FIG. 13 shows an articulated structure for moving the pieces of a puzzle back and forth and up and down relative to a child using the structure;

FIG. 14 is a front view of a L-shaped retainer used in cooperation with the articulated structure assembly of FIG. 13;

FIG. 15 is a side view of the L-shaped retainer of FIG. 14;

DETAILED DESCRIPTION OF THE PREFERRED EMBODIMENTS

Figure 1:
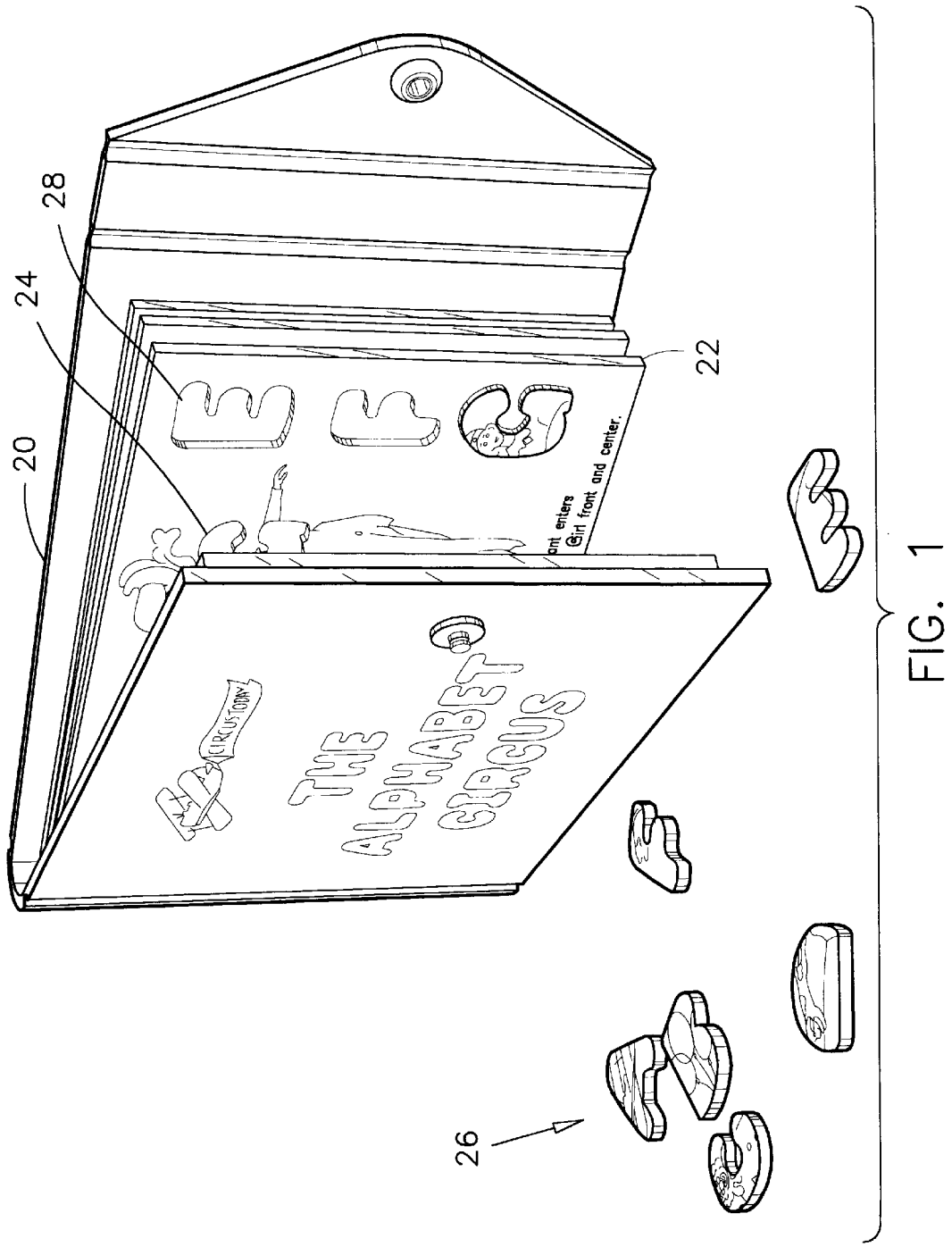
FIG. 1 is a perspective front and top view of a partly open alphabet story book representing a first embodiment of the cognitive nurturing toys of the present invention.

The preferred embodiments of the cognition nurturing toys of the present invention differ substantially from the educational toys of the prior art in that the cognition nurturing toys of the present invention provides third, fourth, fifth or higher dimensions by which a child can learn a series of new symbols. These higher cognitive dimensions, or auxiliary stimuli, are preferably selected from groups of beings, things, places, events or feelings having common attributes to promote the use of geometry, imagination or analytic skills, such that a child can develop these mental capabilities at an early age.

With reference now to the drawings, and in particular to FIGS. 1 to 9 thereof, a new cognition nurturing puzzle embodying the principles and concepts of the present invention will be described. The alphabet story book 20 of the first preferred embodiment, comprises a number of page boards 22 having each a number of first cavities 24 for receiving a corresponding number of puzzle pieces 26 during active use of the story book, and an equal number of second cavities 28 for storing the same puzzle pieces when the story book is stowed away. Each of the cavities 24,28 and the corresponding puzzle piece 26 have the shape of one letter of the alphabet. It will be appreciated that the depth of each cavity is slightly less than the thickness of each puzzle piece, such that the pieces 26 are easily manipulated in and out of the cavities.

The story book 20 of the first preferred embodiment has a printed illustration encompassing each letter cavity 24. Each illustration is brightly painted to exercise the child's awareness of colours. Each illustration preferably represents an infantile image of a person, animal or of an object whose name has a first letter, or a dominant letter corresponding to the shape of the puzzle piece to be inserted in that cavity.

Figure 2:
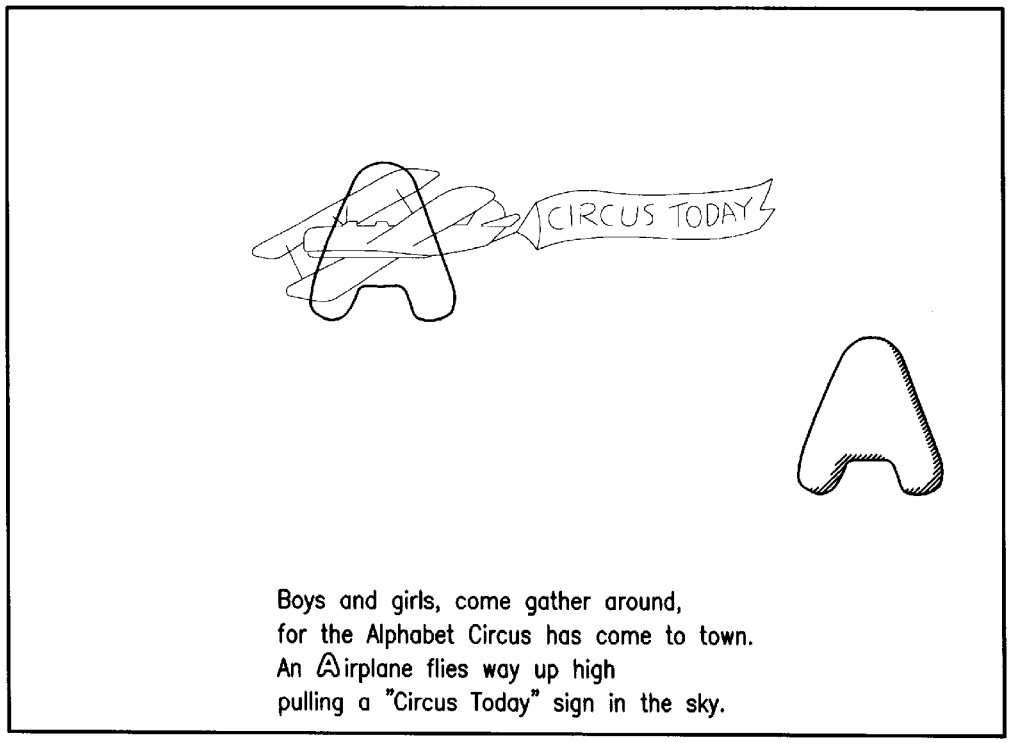
FIGS. 2–9 illustrate respectively, pages 1 to 8 of the alphabet book shown in FIG. 1.

The letter 'A' for example fits into a cavity in the illustration of an airplane in FIG. 2. Similarly, the letter piece 'B' goes with the balloons in FIG. 3. The letter piece 'C' fits into a cavity encompassing a clown. The letter piece 'D' completes the figure of a dog. The letter piece 'E' belongs to the elephant of FIG. 4. The letter piece 'F' goes with the features worn by the girl riding the elephant. The letter piece 'G' completes the whole picture of the girl carried by the elephant.

Each letter piece contains distinctive details and colours of the illustration surrounding the matching cavity. The placement of a puzzle piece in a proper cavity completes the whole picture of the illustration whereby a child can confirm his/her learning of the particular letter piece.

Thus far, the described associative learning aids of the puzzle of the first preferred embodiment are shape, colour and whole picture recognition. The puzzle of the first preferred embodiment has, however, an additional cognitive dimension to it. Each illustration or image in the puzzle is placed in a meaningful environment, a circus scene that is.

The purpose of this meaningful environment in this particular instance, is to provide a fourth cognitive dimension by which a child can memorize the sequence of the letters in the alphabet. By looking at two or more characters in a meaningful environment, a child can form mental images or invent imaginary stories according to his/her fantasy about these characters. These mental images and stories are known to not only help the child remember the sequence of the letters in that group, but to be an efficient method for developing the child's ability to categorize beings, things, places, events or feelings by mentally relating the new knowledge to existing memories.

Figure 3:
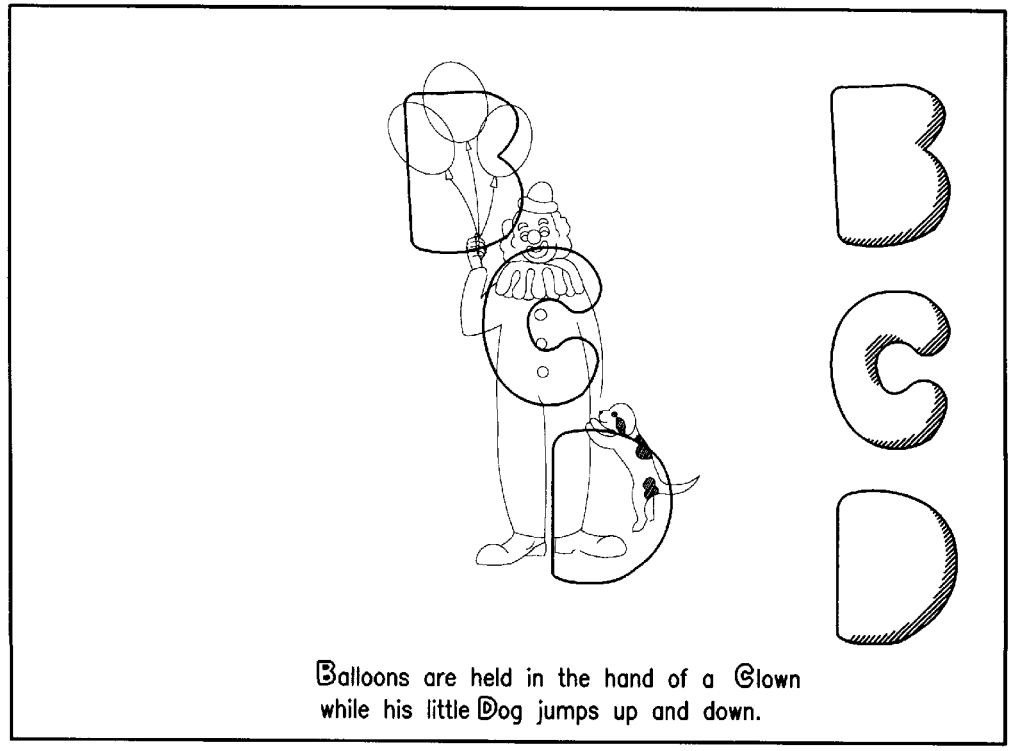
Figure 4:
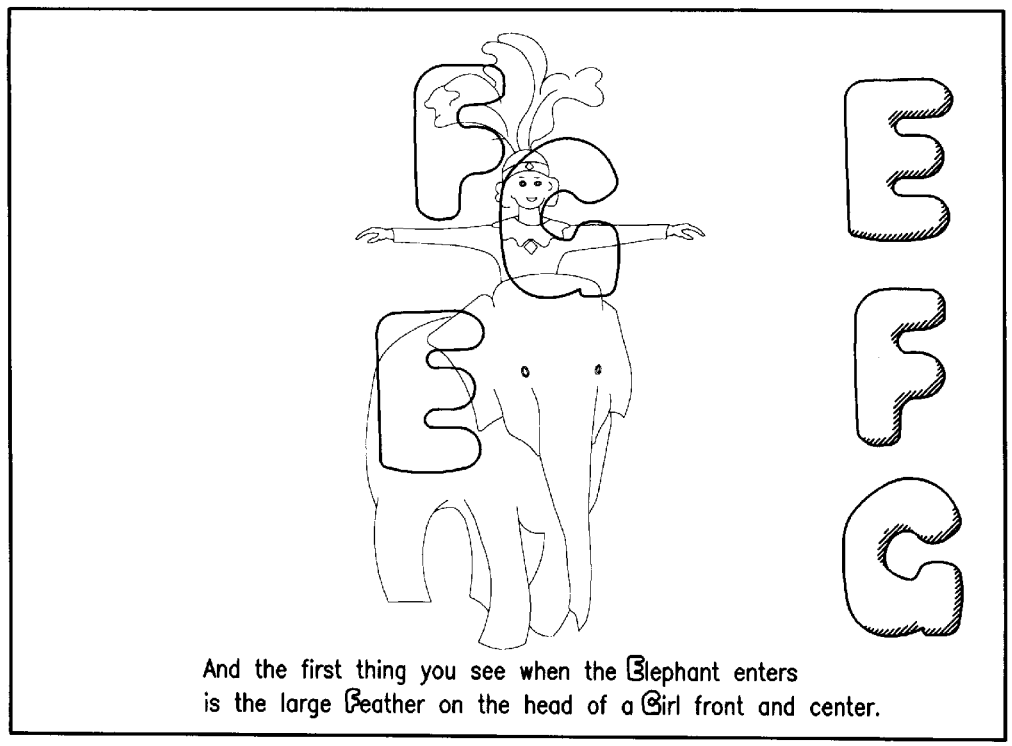
Figure 5:
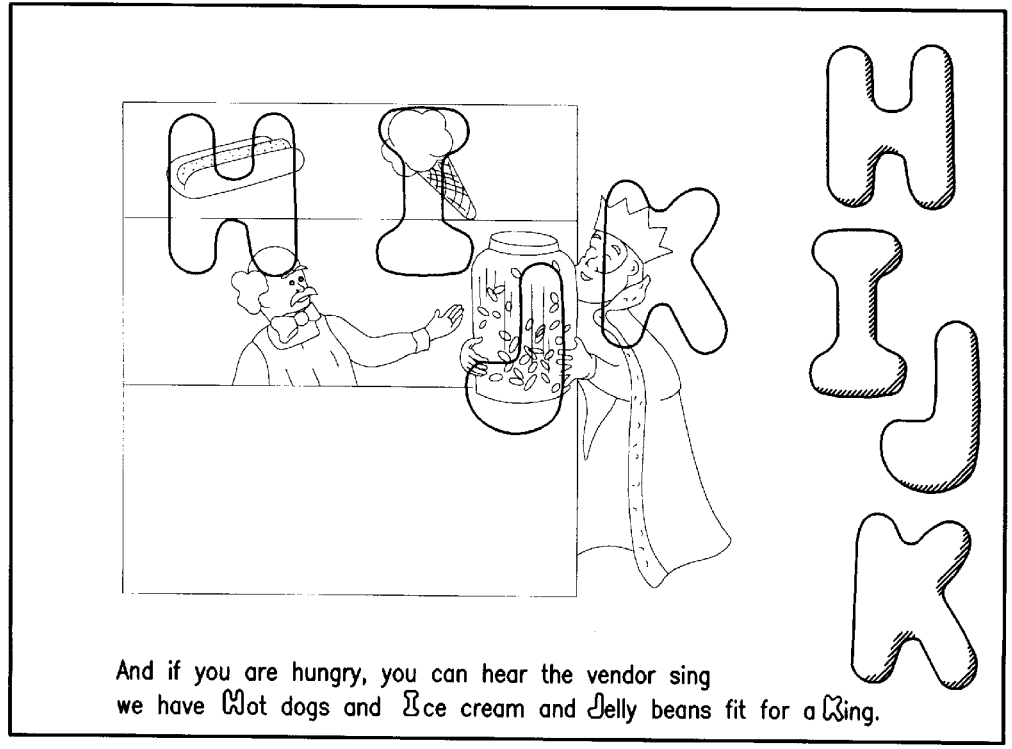
Figure 6:
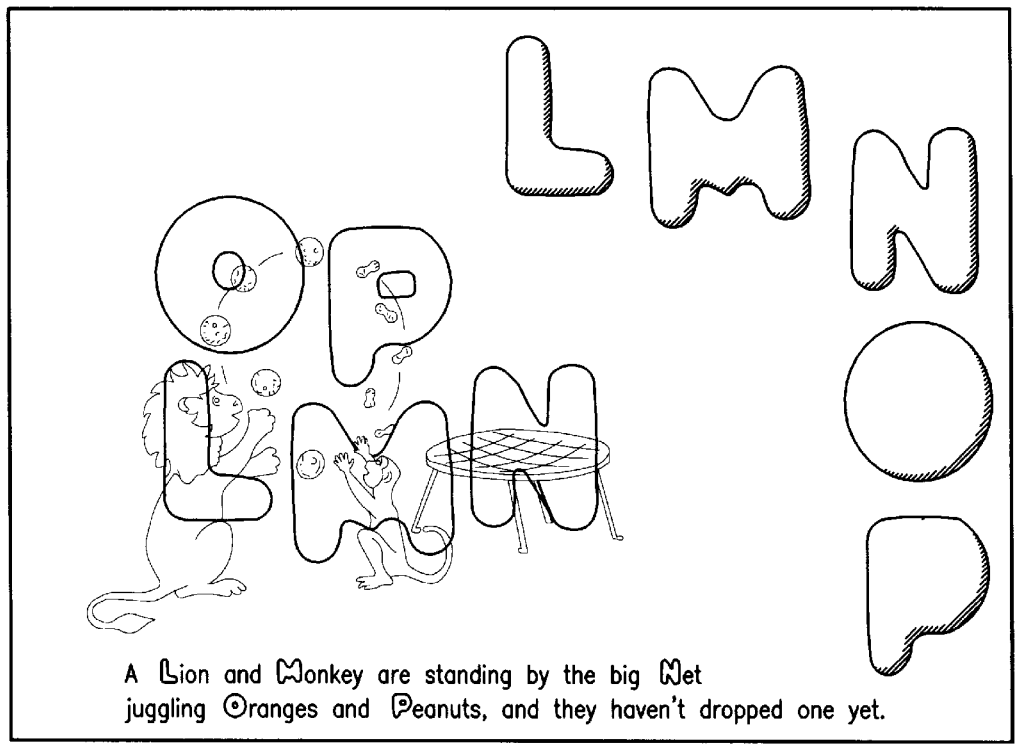
Figure 7:
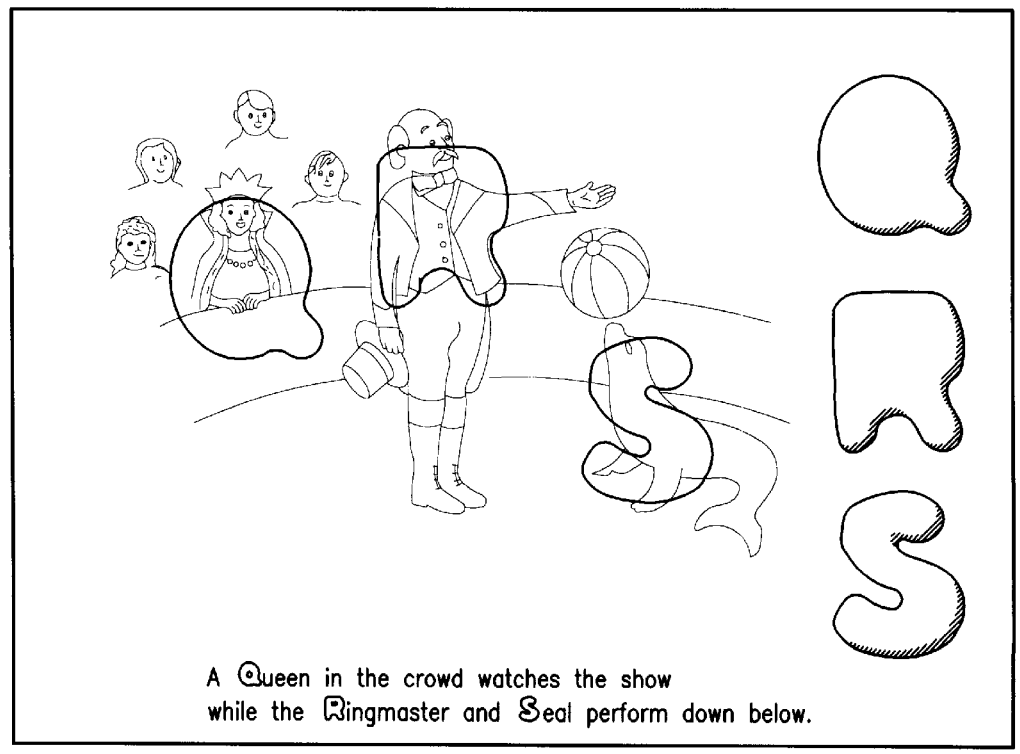
Figure 8:
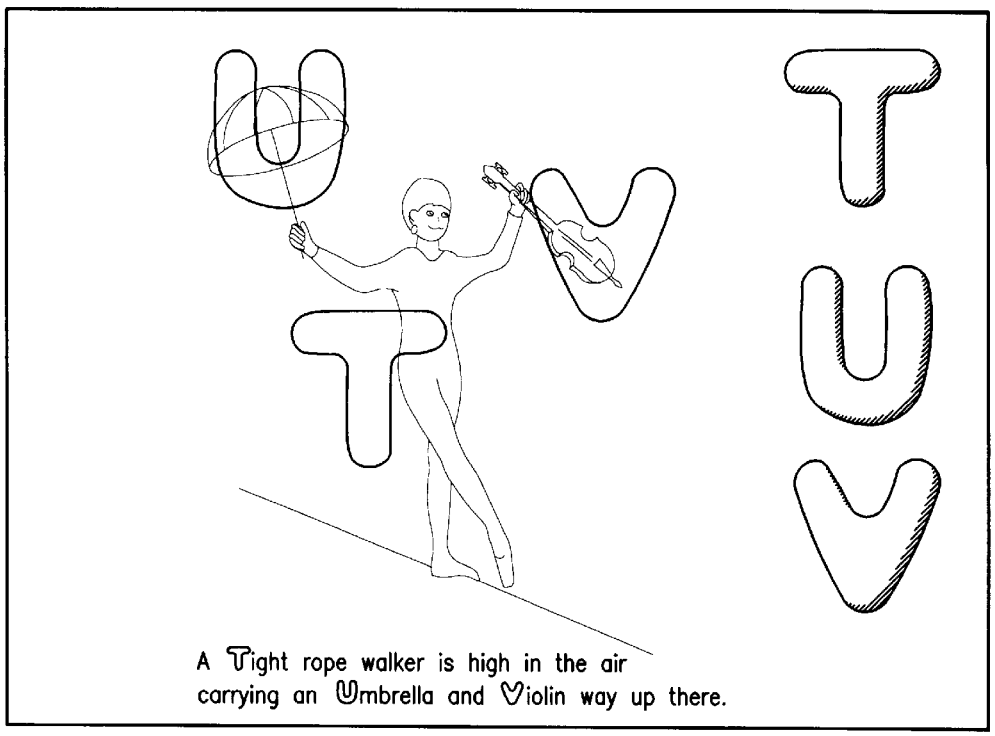
Figure 9:
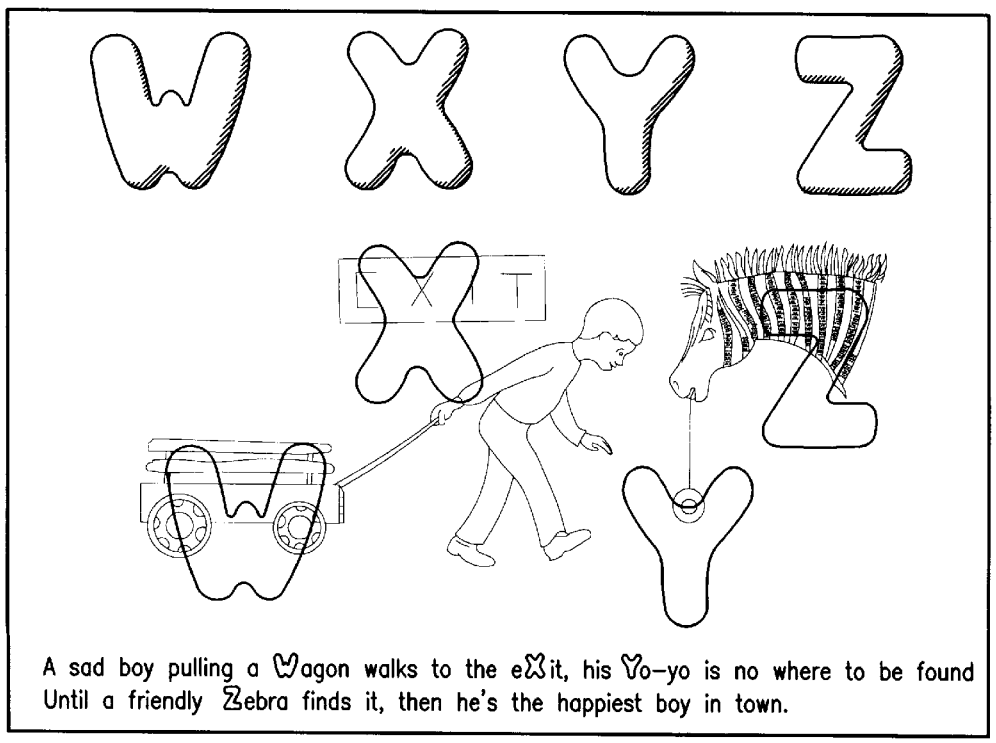

For example, the airplane pulling a banner announcing the venue of a circus illustrated on the first page of the story book 20 is an auxiliary sign or a stimulus to help a child remember that the letter 'A' is the first letter of the alphabet. Similarly, the circus environment illustrated in FIG. 3 shows a clown holding a cluster of balloons and a young dog climbing at the clown's side. Since the illustration is easily perceived by a child, the child can later recall a mental image of the clown to remember that the letter 'C' follows the letter 'B', and that the letter 'D' follows the letter 'C'. The child can later make reference to his/her mental images of the circus scenes to remember that the clown was standing at the entrance of the circus, that the elephant parade was the first major attraction; that the-hot-dog vendor stand was next to the elephant ring and so on. Hence, the fourth dimension of this story book facilitates the memory of the sequence of the letters in the alphabet.

In order to promote the use of all the auxiliary stimuli available in the alphabet story book of the first preferred embodiment, each page of the book contains a strophe of a poem which is to be read to the child by a parent or an educator. This poem is further an auxiliary sign, an audible one, by which the child can remember the sequence of each scene.

Those skilled in the art will appreciate that the letters of the puzzle in the story book of the first preferred embodiment are grouped into one or more circus scenes forming the complete alphabet. It will also be appreciated that this story book is only one example of a meaningful environment for fostering the development of learning strategies. Other environmental stimuli could be for examples, social events such as Christmas or a birthday party, species such as farm or forest animals or geographic sites such as the jungle or the north pole.

A child can then form mental images of each of these groups and of the interaction between each group in order to remember the letters in each group, the sequence of the letters in each group and the sequence of each group in the whole series. Accordingly, the story book of the first preferred embodiment provides learning aids in the form of shape, colour, whole picture, environment recognition, and audible instructions, and exercises the child's mind in the manipulation of these learning stimuli.

Figure 10:
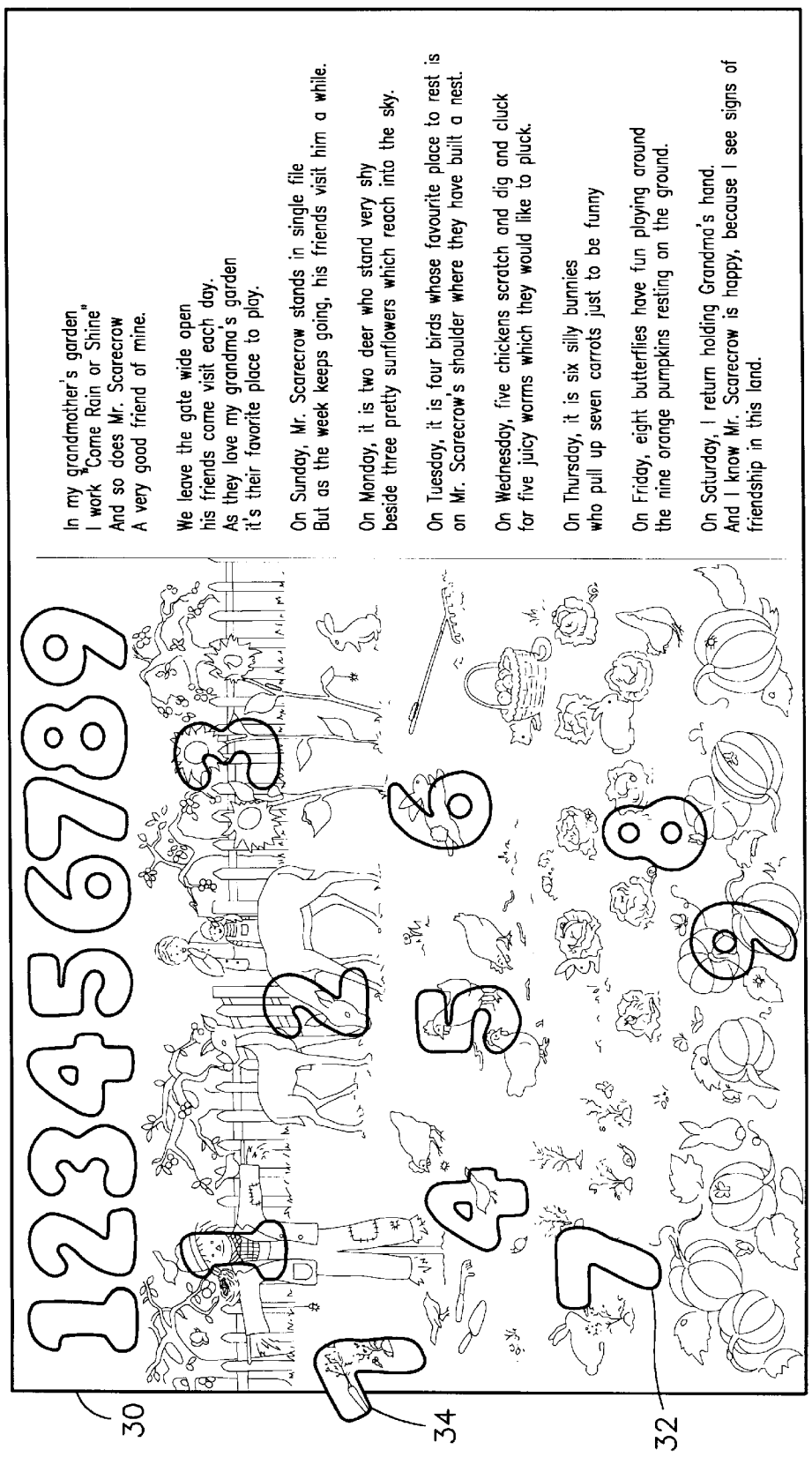
FIG. 10 is a plan view of a numeral story board representing a second embodiment of the cognition nurturing toys of the present invention.

A second embodiment of a cognition nurturing toy of the present invention is illustrated in FIG. 10. The numeral garden board 30 shown therein illustrates a garden environment, and is accompanied by an appropriate story to be read to a child playing with the board. The numeral garden board 30 has a first series of cavities 32 containing each a puzzle piece 34. Each puzzle piece has illustrations and colours which are specific to the illustrations surrounding a corresponding cavity. The numeral garden board 30 further has on a top portion thereof, a printed series of the numbers from one to nine. A child playing with the puzzle pieces can always refer to the printed series of characters to remember the order of a numeral symbol within the series. The numeral garden board of the second preferred embodiment also provides learning stimuli in the form of shape, colour, whole picture, environment recognition, and audible instructions for exercising a child to develop learning strategies.

Figure 11:
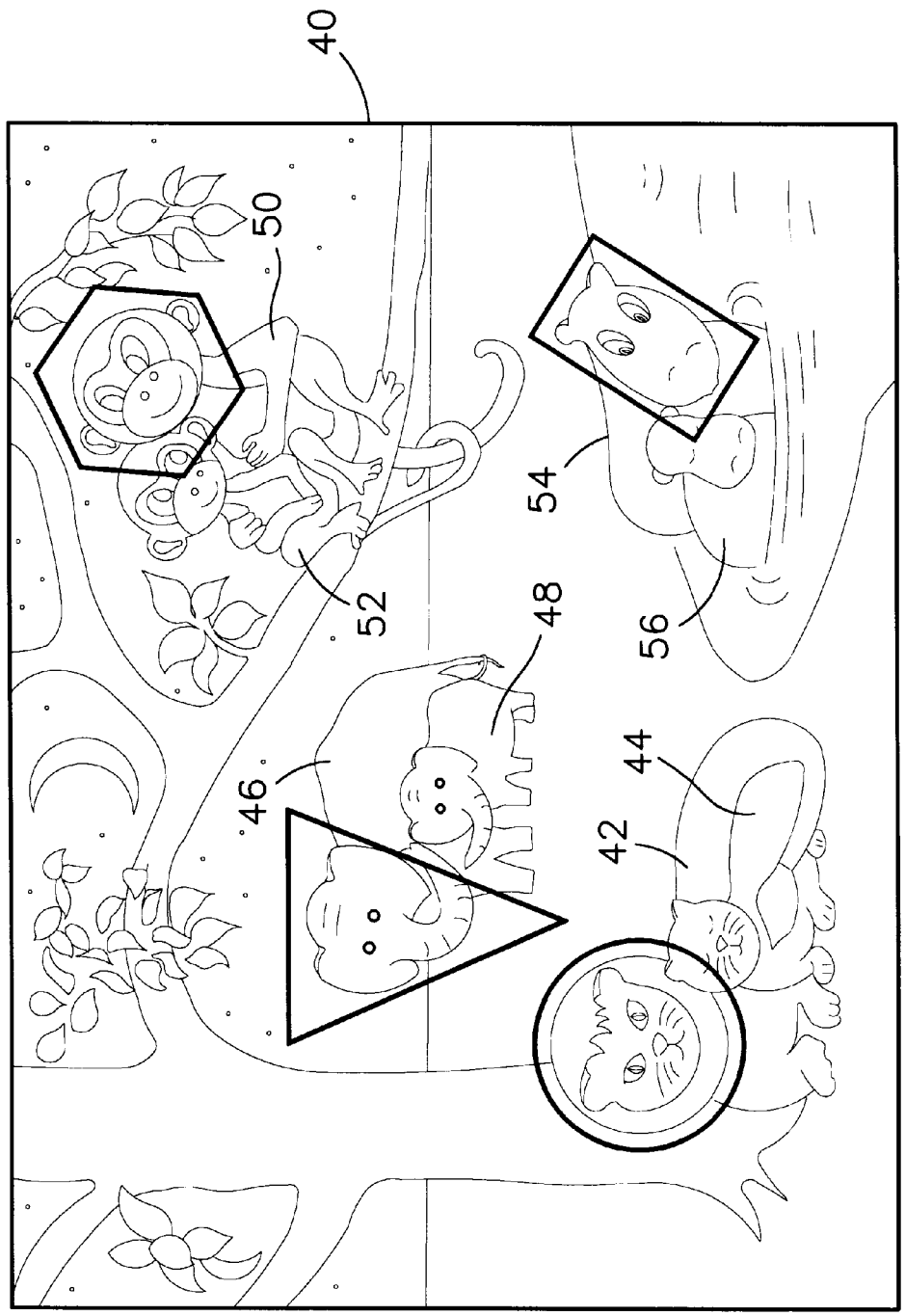
FIG. 11 is a pictorial board with puzzle pieces having various geometrical shapes, and representing a third embodiment of the cognition nurturing toys of the present invention.

In another aspect of the present invention, FIG. 11 illustrates a cognition nurturing puzzle of a third preferred embodiment. The puzzle of the FIG. 11 enables a child to perceive objects using shape, colour, whole picture and symmetry recognition.

The puzzle 40 of the third preferred embodiment illustrates a pair of large and small lions 42,44, a pair of large and small elephants 46,48, a pair of large and small chimpanzees 50,52, and a pair of large and small hippos 54,56. A lion-head puzzle piece fits into a corresponding cavity in the larger lion 42. Similarly, three other animal-head puzzle pieces fit into corresponding cavities in the bodies of the respective larger animals.

The animal-head puzzle pieces are insertable in a proper cavity using the aforesaid shape, colour and whole picture recognition skills. Furthermore, the shape of each of the puzzle pieces is symmetrical with the head of the smaller animal laying next to the larger animal to which the puzzle piece belongs. A child is thereby able to develop symmetry recognition skills when manipulating the pieces of this puzzle.

Figure 12:
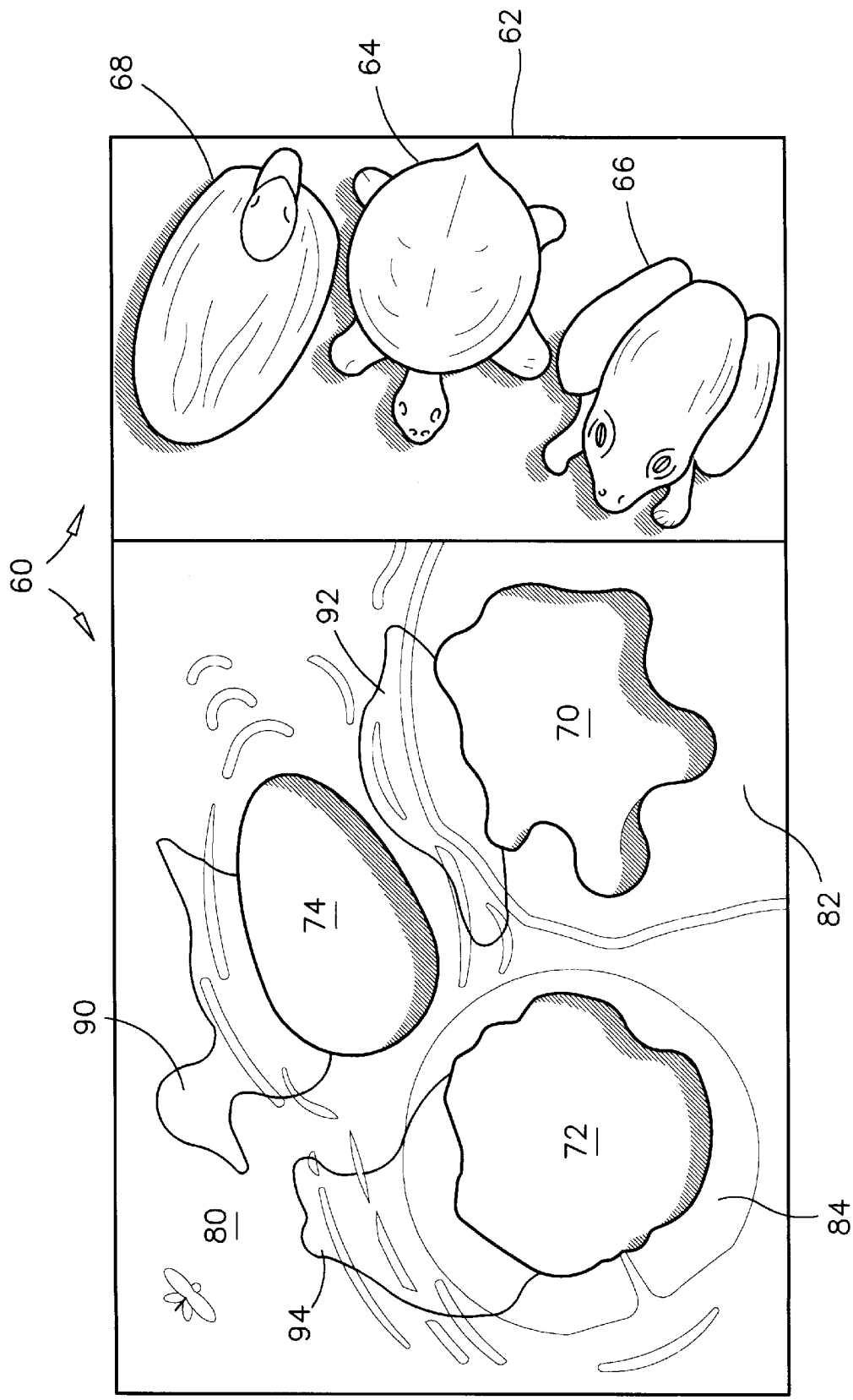
FIG. 12 is a fourth embodiment of the cognition nurturing toys of the present invention illustrating three-dimensional figures of various animals.

A fourth preferred embodiment of the present invention is illustrated in FIG. 12. The cognition nurturing toy of the fourth preferred embodiment 60 comprises a flat board 62 and a group of three-dimensional objects representing a turtle 64, a frog 66, and a duck 68. The flat board 62 has three cavities having respectively the shape of an outline of a plan view of the turtle 70, an outline of a plan view of the frog 72 and an outline of a plan view of the duck 74. The board further illustrates a water pond 80 a sandy shore 82 and waterlily plant 84. Near the duck cavity 74 there is illustrated a shadow of a duck 90 having the same colour as the three-dimensional object representing the duck 68. A shadow of the turtle 92 and a shadow of a frog 94 are similarly represented on the surface of the board 62 next to the cavity into which these pieces fit.

The three-dimensional pieces 64, 66 and 68 of this cognition nurturing toy are associable with a respective cavity 70, 72 and 74 by using shape recognition wherein the plan view of each object corresponds to the shape of the corresponding cavity. The three-dimensional pieces of this toy are also associable with a respective cavity by using colour recognition wherein the colour of each of the shadows 90, 92 and 94 corresponds to the colour of the corresponding three-dimensional object. The three-dimensional pieces of this toy are further associable with a respective cavity by whole picture recognition wherein the water pond 80 is better perceived when the duck 68 covers the cavity 74 in this body of water; wherein the sandy shore 82 is hardly recognizable without the turtle 64 standing on it, and wherein the waterlily leave 84 does not resemble a waterlily leave without the frog 66 covering the central cavity in it.

In the cognition nurturing toy 60 of the fourth preferred embodiment, each animal is set in an environment which is natural to that animal. A proper placement of a three-dimensional piece 64, 66 or 68 completes a common scenery. A child manipulating this toy can appreciate the sight of each scenery and develop thereby environment recognition skills.

Symmetry is another cognitive dimension by which association of the three-dimensional pieces with a respective cavity may be effected. The symmetry of each three-dimensional object with the corresponding two-dimensional shadow is a further learning aid which can be exercised with the toy of this fourth preferred embodiment.

A further cognitive dimension included in the toy of the fourth preferred embodiment is designated as perspective geometry. Those skilled in the art will appreciate that in order to establish a relation between a cavity forming the outline of a plan view of an object, a shadow representing a side view of that object, and the three-dimensional embodiment of that object requires certain ability to perceive objects in a spatial mode. Hence, the toy of this fourth preferred embodiment provides a child with the ability to manipulate learning aids in the form of shape, colour, whole picture recognition, as well as symmetry recognition, environment recognition and perspective geometry recognition.

With respect to the above description then, it is to be realized that the third, fourth, fifth and higher cognitive dimensions of the toys of the present invention are not limited to shape, colour, whole picture, environment, symmetry and perspective geometry. Other cognitive dimensions may include without being limited thereto, association by species such as bird, fish and plants, group similarities such as age, gender and race, related illustrations representing sensations such as warm, loud, odorous and smooth, and emotions such as happiness, courage and love. All these other cognitive dimensions are intended to be encompassed by the present invention.

When these higher cognitive dimensions are taught to a child in combination with the conventional shape and colour recognition, the learning ability of that child is proportionally increased. A child using a variety of toys of the present invention can learn to draw upon a multitude of cognitive dimensions to classify and associate new beings, things, places, events and feelings to existing knowledge to better understand, learn and remember this new knowledge.

As can be appreciated, all the cognitive dimensions described thus far have common attributes related to the sense of sight and hearing of a child and therefor require no further explanations. Those knowledgeable in the art will appreciate, however, that the sense of touch is an inborn cognitive dimension which is used by a child at a very young age for confirming the shape of objects perceived by the eyes. It is therefor believed that when the cognition nurturing toys of the present invention are used by a very young infant, less than one year old for example, these toys should be strategically structured and positioned to append a tactile dimension to the learning activity.

Accordingly, the object of the subsequent preferred embodiment is to promote the use of a tactile dimension in a learning activity by inducing the child to work the puzzle pieces off remote retainers and to carry these pieces over substantial distances before placing the pieces in the cavities of the puzzle board.

Referring to FIGS. 13, 14 and 15, the cognition nurturing toy of the third preferred embodiment 40 is preferably laid on the floor, at a distance from an horizontal bar 100 and support structure 102 assembly supporting the puzzle pieces 104. The distance mentioned above is preferably greater than the child's arm length for inciting the child to move about while carrying a puzzle piece.

Each of the puzzle pieces 104 is attached to a respective L-shaped retainer 106 having strips of gripping material 108 on two surfaces thereof. Each puzzle piece 104 has a piece of mating material (not shown) on the backside thereof such that it is attachable to the gripping material of the L-shaped retainers. The cavities 110 of the board 40 may also have strips of gripping material 112 for similarly retaining puzzle pieces 104 therein. It will be appreciated that the thickness of the puzzle pieces 104 is slightly more than the depth of the cavities 110 such that these pieces may be subsequently removed from the cavities.

Each L-shaped retainer 106 further has a slot 114 in one extremity thereof for receiving a holding strap 116. In the subsequent preferred embodiment of the present invention, the holding straps 116 are used for suspending a respective L-shaped retainer 106 to the horizontal bar 100 as illustrated in FIG. 13. When a L-shaped retainer 106 is suspended in this manner, the puzzle piece 104 may be attached to the vertical surface or to the horizontal surface of the retainer. When the puzzle piece is held to the horizontal surface for example, a very young infant can crawl under the suspended puzzle pieces, look at these pieces while lying on the floor and pull the pieces off the retainers in a downward motion. The child can thereafter crawl to the puzzle board 40 and confirm his knowledge of the shape, colour, whole picture and symmetry of the piece by inserting the piece in a proper cavity.

The L-shaped retainers 106' may also be placed on the floor with the puzzle pieces 104' attached to the riser part of the retainer. In this instance, the retainers 106' may be initially placed by a parent for example at a more or less distant point from the board 40 such that a child is given the opportunity to develop a motivation to reach. Such initiative is known to be important in the normal development of a child, and it can be appreciated that the sooner a motivation to reach is developed, the earlier the child will add dexterity to his learning strategy resources.

The horizontal bar 100 of the support structure assembly preferably has the shape of a crank-bar, and is preferably optionally activated in a rotational motion by a windable clockwork 118. When the straps 116 of the L-shaped retainers are attached at various locations along the crank-bar, and the clockwork is activated, the puzzle pieces 104 attached to the L-shaped retainers 106 move up and down and back and forth relative to a child standing or laying nearby. The movement of the pieces further stimulates the child to develop an ability to reach, and more importantly, this movement develops the child's perception of depth.

The support structure assembly 100, 102 and the L-shaped retainers 106 of this subsequent preferred embodiment or the present invention, allows the placement of the puzzle pieces 104' in a different plane than the puzzle board 40, and at a distance from the puzzle board 40 which is greater than the arm's length of the child. The structure and retainers of this subsequent preferred embodiment allow the working of the puzzle pieces off the retainers and a lengthy manipulation of the pieces, whereby the child can better feel the curved edges of a disc, the acute angles of a triangle, the obtuse angles of a polygon or the straight edges of a rectangle for examples.

The tactile dimension of the cognition nurturing toys of the present invention is further an important aspect in the development of a child wherein it induces a child to develop a motivation to reach, a sense of initiative and consequently a pro-active attitude towards learning.

Figure 16:
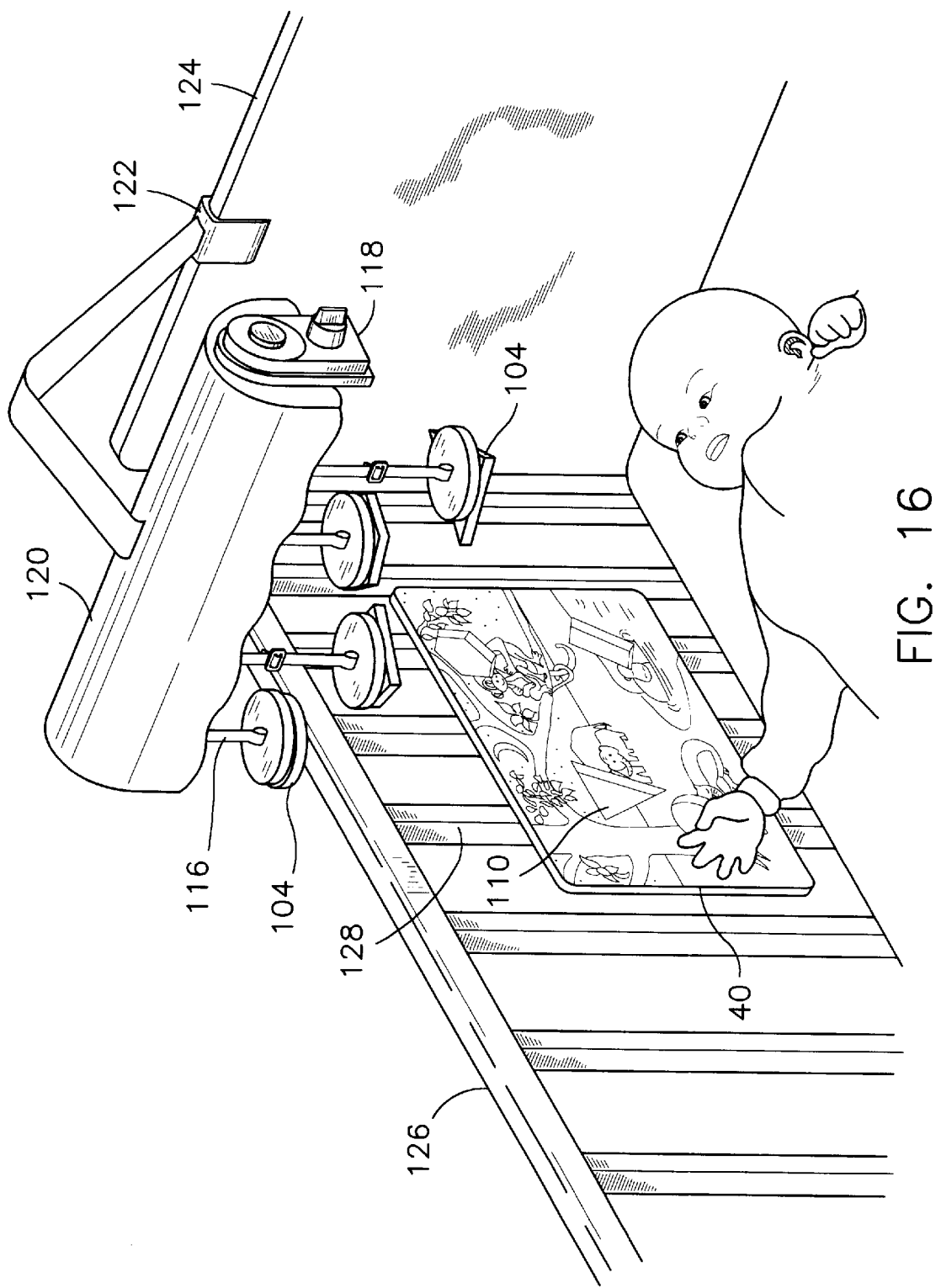
FIG. 16 shows a modified embodiment of the articulated structure of FIG. 13 mounted in a baby crib.

This aspect in the development of a child is preferably promoted at a very early age of the infant, and even as early as when the baby starts to roll over and sit. At this stage, one can consider the installation a modified embodiment 120 of the articulated structure 100, having a clamping member 122 and being mountable to the headboard 124 of a crib 126 for example, as illustrated in FIG. 16. With this embodiment of the present invention it is recommended to include the singing of a lullaby to the child while the child is playing with the puzzle board 40, to further promote a motivation to reach at the same time as a development of rhythm.

The purpose of this modified embodiment 120 is to arouse the baby's curiosity while the baby is laying in a crib. As soon as the baby can grab and pull a puzzle piece 104 from one of the retainer 106, he/she can relate the shape of die puzzle piece to one of the cavities 110 of the puzzle board 40 mounted on the side bars 128 of the crib 126 for example, and start to learn all the aforesaid associative skills.

While the above description provides a full and complete disclosure of various preferred embodiments of the cognition nurturing toys of the present invention, various modifications and equivalents may be employed without departing from the true spirit and scope of the invention. Such changes might involve alternate environmental themes, structural arrangements, sizes, construction features and the like. Therefore, the above description and the illustrations should not be construed as limiting the scope of the present invention which is defined by the appended claims.

I claim:

1. A cognition nurturing toy for enhancing the learning ability of a child, comprising;

at least one rigid board having a series of first cavities therein, each of said first cavities having a distinct outline belonging to a first set having a sequence, a plurality of distinct pieces each having a shape corresponding to one of said outlines in said first set and each being insertable in, and removable from one of said first cavities;

a colourful illustration printed on said at least one rigid board and on said pieces; said colourful illustration representing an environment and a plurality of objects associable to each other and to said environment, each of said objects having colours and graphic properties; and each of said objects being printed over one of said pieces and on said board in a vicinity of one of said first cavities having said outline corresponding to said shape of said one of said pieces, with said colours and graphic properties of said each said objects being common to both said one of said pieces and said vicinity, such that when said distinct pieces are removed from said first cavities, a child using said rigid board and said distinct pieces is able to associate said one of said distinct pieces to said one of said first cavities, using shape recognition, colour recognition and whole picture recognition, and said child further can learn said sequence of said pieces in said first set using his/her memory of said associable objects in said environment.

2. The cognition nurturing toy as claimed in claim 1, further comprising associative means printed on said board for assisting a child in associating said objects to one another.

3. The cognition nurturing toy as claimed in claim 2, wherein said associative means is of a pictorial nature comprising an illustrated connection between two of said objects.

4. The cognition nurturing toy as in claim 2, wherein said associative means is of a literary nature comprising a written strophe related to said environment.

5. The cognition nurturing toy as claimed in claim 2 wherein said associative means is a written story related to said environment, such that when said story is read to a child, said child can use auditory signs in said story for remembering said sequence of said distinct pieces within said environment.

6. The cognition nurturing toy as claimed in claim 2 wherein said at least one rigid board is a book of rigid boards.

7. The cognition nurturing toy as claimed in claim 6 wherein said associative means is a written strophe printed on each of said rigid boards, and said strophe being part of a poetic story depicted in said book, such that when said strophes and said poetic story are read to a child, said child can use auditory signs in said strophes and said poetic story for remembering said sequence of said distinct pieces within said environment.

8. The cognition nurturing toy as claimed in claim 1 wherein said first set is a group of neighbouring letters of the alphabet.

9. The cognition nurturing toy as claimed in claim 8 wherein each said object represents an infantile image of a being, thing or event whose name has a first letter corresponding to one of said letters of the alphabet.

10. The cognition nurturing toy as claimed in claim 9 wherein said environment is a scene of a circus.

11. The cognition nurturing toy as claimed in claim 8 wherein said at least one rigid board is a book comprising a plurality of said rigid boards bound to one-another along common edges with each said rigid board showing a different group of said letters of the alphabet.

12. The cognition nurturing toy as claimed in claim 1 wherein said board comprises an array of second cavities, each of which has a distinct outline belonging to said first set, such that said array of second cavities is usable for storing said distinct pieces therein, and is also usable by a child as an auxiliary sign for remembering said sequence of said distinct pieces.

13. A cognition nurturing toy for enhancing the learning ability of a child, comprising;
at least one rigid board having a series of first cavities therein, each of said first cavities having a distinct outline;
a plurality of distinct pieces each having a shape corresponding to one of said outlines in said first set and each being insertable in, and removable from one of said first cavities; and
a colourful illustration printed on said at least one rigid board and on said pieces; said colourful illustration comprising a pair of a first and second images, said first image being printed on one of said pieces and said second image being printed on said board in a vicinity of said cavity corresponding to said one of said pieces, said first image being symmetrical to but differing in size and posture from said second image, and said images in said pair having common colours and graphic properties,
such that when said distinct pieces are removed from said first cavities, a child using said rigid board and said distinct pieces is able to associate each of said distinct pieces to a respective said cavity, using shape recognition, colour recognition and symmetry recognition between said first and second images.

14. The cognition nurturing toy as claimed in claim 13 wherein said outlines represent various geometrical shapes.

15. The cognition nurturing toy as claimed in claim 14 further comprising means for retaining said distinct pieces at a distance from said rigid board wherein said distance is greater than a child's arm length, such that a child using said rigid board, said distinct pieces and said means for retaining said distinct pieces at said distance from said rigid board is able to develop a motivation to reach and is able to exercise a sense for dexterity for shapes.

16. The cognition nurturing toy as claimed in claim 15 wherein said means for retaining said distinct pieces at a distance from said rigid board comprises means for retaining said distinct pieces in an upright alignment, such that when said rigid board is adapted to be laid horizontally, a child using said rigid board, said distinct pieces and said means for retaining said distinct pieces at said distance from said rigid board is able to develop a sense for spatial geometry.

17. A cognition nurturing toy for enhancing the learning ability of a child comprising: a rigid board having a cavity therein, said cavity having a distinct outline, a three-dimensional piece representing a distinct object, said piece having a shape corresponding to said outline of said cavity and being insertable in, and removable from said cavity; and an image printed on said board adjacent said cavity, said image depicting an environment natural to said object and a shadow-like, angled projection of said piece relative to a view represented by said outline of said cavity; such that a child using said rigid board and said piece is able to learn to associate said object with said cavity and said image by using perspective geometry recognition of said projection.

18. The cognition nurturing toy as claimed in claim 17, wherein said view represented by said outline is a top view of said piece, and said projection is a side view of said object.

19. The cognition nurturing toy as claimed in claim 17, wherein said projection is a shadow of said object.

20. A cognition nurturing toy for enhancing the learning ability of a child, comprising;
at least one rigid board having a series of first cavities therein, each of said first cavities having a distinct outline belonging to a first set;
a plurality of distinct pieces each having a shape corresponding to one of said outlines in said first set and each being insertable in, and removable from one of said first cavities;
a colourful illustration printed on said at least one rigid board and on said pieces, said illustration representing an environment and a plurality of objects associable to each other and to said environment, each of said objects having colours and graphic properties;
each said object being printed over one of said pieces and on said board in a vicinity of one of said first cavities having said outline corresponding to said shape of said one of said pieces, with said colour and graphic properties of said each of said objects being common to both said one of said pieces and said vicinity, and
pictorial associative means printed on said board for assisting a child in associating said objects to said environment and to one another; and
a structure comprising an horizontal bar having means for holding said distinct pieces in an upright orientation;
such that when said rigid board is adapted to be laid horizontally at a distance from said structure, a child using said rigid board, said distinct pieces and said structure is able to develop a motivation to reach, and to associate said each piece to said only one of said first cavities, using shape recognition, colour recognition and whole picture recognition, and said child further can assign a sequence to said outlines in said set using his/her memory of said associable objects in said environment.

21. The cognition nurturing toy as claimed in claim 20, wherein said horizontal bar is a crank-bar movable in a circular motion about a longitudinal axis thereof, for moving said distinct pieces up and down and back and forth relative to said structure, such that said child can further develop a perception of depth.

* * * * *

UNITED STATES PATENT AND TRADEMARK OFFICE
CERTIFICATE OF CORRECTION

PATENT NO. : 5,980,354
DATED : November 9, 1999
INVENTOR(S) : Jed Prest

It is certified that error appears in the above-identified patent and that said Letters Patent is hereby corrected as shown below:

On the title page item [76], replace the words "Wolfville, Canada, 1X0"

by the words "Wolfville, Nova Scotia, Canada, B0P 1X0"

Signed and Sealed this

Eighteenth Day of July, 2000

Attest:

Q. TODD DICKINSON

*Attesting Officer*      *Director of Patents and Trademarks*